(12) United States Patent  (10) Patent No.: US 7,581,348 B2
Taylor  (45) Date of Patent: Sep. 1, 2009

(54) FISH-HOOK

(75) Inventor: Grahame Douglas Taylor, 141 Austinville Road, Mudgeeraba, Queensland 4213 (AU)

(73) Assignees: Grahame Douglas Taylor, Mudgeeraba (AU); Allan J. Madden, Benowa (AU); Robert G. King, Mudgeeraba (AU)

(*) Notice: Subject to any disclaimer, the term of this patent is extended or adjusted under 35 U.S.C. 154(b) by 171 days.

(21) Appl. No.: 10/484,376

(22) PCT Filed: Jul. 17, 2002

(86) PCT No.: PCT/AU02/00952

§ 371 (c)(1),
(2), (4) Date: Jun. 3, 2004

(87) PCT Pub. No.: WO03/007706

PCT Pub. Date: Jan. 30, 2003

(65) Prior Publication Data

US 2004/0216362 A1 Nov. 4, 2004

(30) Foreign Application Priority Data

Jul. 18, 2001 (AU) .................................... PR6455

(51) Int. Cl.
*A01K 91/04* (2006.01)
(52) U.S. Cl. ..................... 43/44.83; 43/43.16
(58) Field of Classification Search ............... 43/44.83, 43/42.49, 43.16
See application file for complete search history.

(56) References Cited

U.S. PATENT DOCUMENTS

| | | | | |
|---|---|---|---|---|
| 1,401,086 | A | * 12/1921 | King | .................. 43/44.83 |
| 2,222,277 | A | 11/1940 | Baker | |
| 2,984,882 | A | 5/1961 | Winn | |
| 3,138,840 | A | 6/1964 | Rich | |
| 3,604,143 | A | 9/1971 | Sauers | |
| 4,092,796 | A | 6/1978 | Adams | |
| 4,294,031 | A | 10/1981 | Manno | |
| 4,535,562 | A | 8/1985 | Fry | |
| 4,905,403 | A | 3/1990 | Manno | |
| 5,113,616 | A | 5/1992 | McManus | |
| 5,279,067 | A | 1/1994 | Tolison | |
| 5,313,736 | A | * 5/1994 | Rosenberg et al. | .......... 43/44.83 |
| 5,369,905 | A | 12/1994 | DeMars | |
| 5,537,776 | A | * 7/1996 | Gilard, Sr. | .................. 43/42.49 |
| 5,809,687 | A | * 9/1998 | Rosenberg | .................. 43/44.83 |

FOREIGN PATENT DOCUMENTS

WO WO 02/082897 A1 10/2002

\* cited by examiner

*Primary Examiner*—T. Nguyen
(74) *Attorney, Agent, or Firm*—Workman Nydegger (57) ABSTRACT

A fish-hook (10) including: (a) a shank (12); (b) a bend (14) extending from the shank (12); (c) a point (16) defined by a free end of a bend (14); wherein an end portion (18) of the shank (12) defines a helical formation having at least three spaced volutes (22.1, 22.2, 22.3, 22.4), with a first volute (22.1) closest tod the bend (14) and a final volute (22.4) furthest from the the bend (14).

13 Claims, 11 Drawing Sheets

FISH-HOOK

FIELD OF THE INVENTION

This invention relates to a fish-hook. More particularly, this invention relates to a fish-hook and to a connecting device.

BACKGROUND OF THE INVENTION

Fishing is an extremely popular pastime. A key component of a successful fishing venture is the ability to tie knots. It is well known that most fish are lost because of a badly tied line or the failure of a knot.

A significant problem with attaching fish-hooks to line is associated with the fact that a fisherman has to thread the line through a small opening. This can be difficult, especially on a boat or in inclement weather.

Once the line has been threaded through the opening, the line must be tied. There are a number of different ways that are used to tie a knot in the line. Examples of some knots are the trilene knot, the clinch knot, the improved clinch knot, the palomar knot, the orvis knot and many others. All these knots require the winding of line and subsequently passing the line through an opening defined by the winding. This task can be both difficult and time-consuming. Inclement conditions and/or boat-based fishing add to the problem.

Even without such conditions, many beginners find it difficult to learn how to tie an effective knot. Applicant believes that this often bars potential newcomers to the pastime. As recreational fishermen become older, they also find it difficult to tie the required knots.

These problems are not limited to recreational fishing. Commercial fishermen who use lines and fish-hooks spend much time preparing their lines. Most of this time is taken up at attaching fish-hooks to the line. These fishermen use knots like the trilene knot and the clinch knot to attach fish-hooks to line. Long-line fishing requires a large number of knots per line. In spite of the large number of devices and apparatuses described in the patents cited below, the commercial fishermen still use the conventional knots described above.

Applicant submits that the reason for this is that the devices and apparatus are either difficult to manufacture or do not provide the strength characteristics of the conventional knots. This is significant since long-line fishermen often have to attach hooks as fast as possible and in heavy seas. Long-line fishing require the deployment of many kilometers of lines with hundreds of fish-hooks attached to the lines. In some case, the lines can extend for up to 30 kilometers or more. These are attached to sophisticated reeling machines. It will be appreciated that the attachment of fish-hooks to such lines can be extremely time-consuming. It is clear that any running repairs should be carried out as quickly as possible. It follows that a means for reducing downtime is desirable.

The simplification of knot-tying has been the object of a number of patents. For example, U.S. Pat. No. 2,984,882 dated May 23, 1951 to R. W. Winn shows a line connector. The line connector allows a fish-hook to be fastened to a line without a conventional knot. This apparatus relies on the principle of using at least one closed loop through which the line is passed and then wound about itself on a straight shank. The line is trapped in a loop at one end of a shank. This apparatus does not avoid the problems of having to pass a line through a loop. Furthermore, the act of trapping the line in the loop at the end of the shank also requires some dexterity.

U.S. Pat. No. 3,604,143 dated Sep. 14, 1971 to Sauers discloses a fish-hook with a shank that defines a pair of spaced openings. The line is fastened to the fish-hook by passing the line through one opening, wrapping the line about a portion of the shank between the openings and passing the line through the other opening. The line is then wrapped over the previously wrapped line and passed through the initial opening again. Clearly, this requires the line to be passed through two openings. Applicant submits that this simply results in the fisherman having to pass the line through two openings. As a result, the problems associated with passing the line through an opening are duplicated. These problems have been set out above.

U.S. Pat. No. 3,848,354 to Austad et al discloses a quick tie device. The device is a convoluted arrangement of loops. One of the loops defines a winding post while the other defines a guide loop through which the line is passed. The winding loop extends generally at right angles to the direction in which the line extends. This device requires a complicated winding procedure. It is also necessary to pass the line through a loop. Applicant therefore submits that it is difficult to see how this device provides any improvement over a conventional knot. Further, Applicant believes that the manufacture of the device would require complicated wire bending equipment. This would result in the device being expensive to manufacture; especially on a large scale.

U.S. Pat. No. 4,092,796 dated Jun. 6, 1978 to Adams discloses a fish-hook that does not include an eyelet. Instead, an end portion of the shank is flattened and bent over into a U-shape. The end portion defines a slot. A line can be positioned in the slot. The line is held in the slot if a suitable knot is made at the end of the line. The know must be too large to pass through the slot. A primary disadvantage of this apparatus is that it is necessary to tie a knot in the line. Further, Applicant believes that such an arrangement is inherently weak. Line material is known to deform under pressure. In the event that extreme tension is set up in the line, Applicant believes that the knot would simply deform and pass through the slot.

U.S. Pat. No. 4,294,031 dated Oct. 13, 1981 to Manno discloses a fish-hook that does require the tying of a knot. The fish-hook has an eyelet at an end of the shank. The shank defines a T-shaped projection. The line is passed through the eyelet and wrapped around the projection. This apparatus suffers the disadvantage of requiring the line to be passed through an eyelet. These are discussed above. Further, a fisherman has to remember to wrap the line a required number of times about the projection. This is a disadvantage in hurried, commercial applications.

U.S. Pat. No. 4,535,582 dated Aug. 20, 1985 to Fry discloses a fish-hook that also does not include an eyelet. Instead, the fish-hook is designed so that a line that already has a loop at its end can be attached to the fish-hook. The disadvantage here is that the line requires some preparation before it can be attached to the fish-hook. This could clearly be as time-consuming as fastening the line to the fish-hook in the conventional manner.

U.S. Pat. No. 4,905,403 dated Mar. 6, 1990, also to Manno, discloses a loop fastening method and device. The device in one embodiment is a fish-hook. The shank defines an eyelet at one end and an open loop between the eyelet and the bend. The line is looped over, passed over the open loop, wrapped about the shank and passed through the eyelet. This device retains the disadvantage that the line needs to be passed through a loop. An outstanding portion of the shank is provided to assist a fisherman to pass the line through the loop. Applicant believes that this portion would have the tendency to snag when the device is used in difficult conditions. Doubling the line and drawing the line over the open loop would also be difficult to do in heavy seas, in commercial applications. Still further, a fisherman has to remember to wrap the line a certain number of times about the shank between the open loop and the eyelet. This is a disadvantage in hurried and difficult situations.

U.S. Pat. No. 5,279,067 dated Jan. 18, 1994 to Tollison describes a fish-hook that does not have an eyelet. An end of the shank is bent over to define a narrow U-shape. The line is positioned along the shank and then wound over itself. Pulling on the line causes it to become bunched in the gap defined by the U-shape. A problem with this apparatus is that it requires manual dexterity in positioning the line before wrapping it over the portion positioned against the shank. Again, this is a disadvantage in situations where the working conditions are difficult. The applicant has found that bunching of line under tension is one of the reasons why knots and other forms of attachment fall.

This invention is directed to a fish-hook and to a connecting device that addressed the disadvantages highlighted by the description of the prior art.

Reference may be made to U.S. Pat. No. 5,537,776 which describes a fishing line connector having a shank and a coiled member defined by a plurality of uniformly spaced contiguous co-axial coils arranged in longitudinally extending relation and having an axial opening therethrough and an open ended eye loop. The problems as described above of passing a fishing line through the eyelet as discussed above with U.S. Pat. No. 4,294,031 are also applicable.

Reference is also made to U.S. Pat. No. 5,809,687 which relates to a method of tying a fishing hook or line to a fishing hook having a shank with a proximal and distal end. The shank has an angled and spaced apart attachment coils formed on the proximal end. There is also a hooked barb on the distal end. The method of tying is extremely complicated involving four separate steps. Also there is no means on the fishing hook to prevent unwinding of the line from the fishing hook and also the problems of passing a line through a loop as discussed above also apply to this reference.

U.S. Pat. No. 2,222,777 refers to fishing tackle with a shank and a closed eye having an attachment arm connected with and extending from the closed eye. The attachment arm is a length of wire in zigzag form and is attached to a fish hook. The fishing tackle is complicated in structure and the disadvantages of using a closed eye or eyelet also apply to this reference as discussed above.

U.S. Pat. No. 3,138,840 refers to a fish hook attaching device which uses a single retaining formation of three turns or volutes at one end of a shank whereby each turn is oriented parallel to the shank. Because of the requirement of three turns this device is unduly complicated and a fishing line must be attached to the retaining formation in a complicated manner because of the orientation of the turns.

SUMMARY OF THE INVENTION

According to a first aspect of the invention, there is provided a fish-hook that includes
(i) a shank;
(ii) a bend extending from the shank;
(iii) a point defined by a free end of the bend; and
(v) a retaining formation formed by a pair of volutes located at an end of the shank remote from the bend wherein the pair of volutes are located closely to each other and wherein each of the volutes has a plane which extends transversely to an axis of the shank and are resiliently flexible with respect to each other to admit a fishing fine therebetween when moved apart and whereby the fishing line is retained between each volute upon their return movement thereof.

Preferably there is also provided a helical formation having a plurality of spaced volutes adjacent the retaining formation.

The helical formation may be separated from the retaining formation by a gap. Preferably a linear portion which defines the gap may extend between the helical formation and the retaining formation.

In a further embodiment the helical formation may be located closely adjacent the retaining formation.

According to a second aspect of the invention, there is provided a connecting device for a fishing line having:
a shank; and
a retaining formation formed by by a pair of volutes located at an end of the shank remote wherein the pair of volutes are located closely to each other and wherein each of the volutes has a plane which extends transversely to an axis of the shank and are resiliently flexible with reset to each other to admit a fishing line therebetween when moved apart and whereby the fishing line is retained between each volute upon their return movement thereof.

The connecting device may include the retaining formation at each end of the shank and in this embodiment there also may be provided the helical formation adjacent each retaining formation.

Thus the connecting device may comprise a unitary, elongate article.

BRIEF DESCRIPTION OF THE DRAWINGS

The invention is now described, by way of example, with reference to the accompanying drawings. The following description is directed to embodiments of the invention so that a person skilled in the art can fabricate and use the embodiments. It follows that the description is not intended to limit the broad scope of the invention described in the above summary.

In the drawings.

DETAILED DESCRIPTION OF THE DRAWINGS

In FIGS. 1 to 3 and 6 to 8, reference numeral 10 generally indicates one embodiment of a fish-hook in accordance with the invention.

Figure 1:
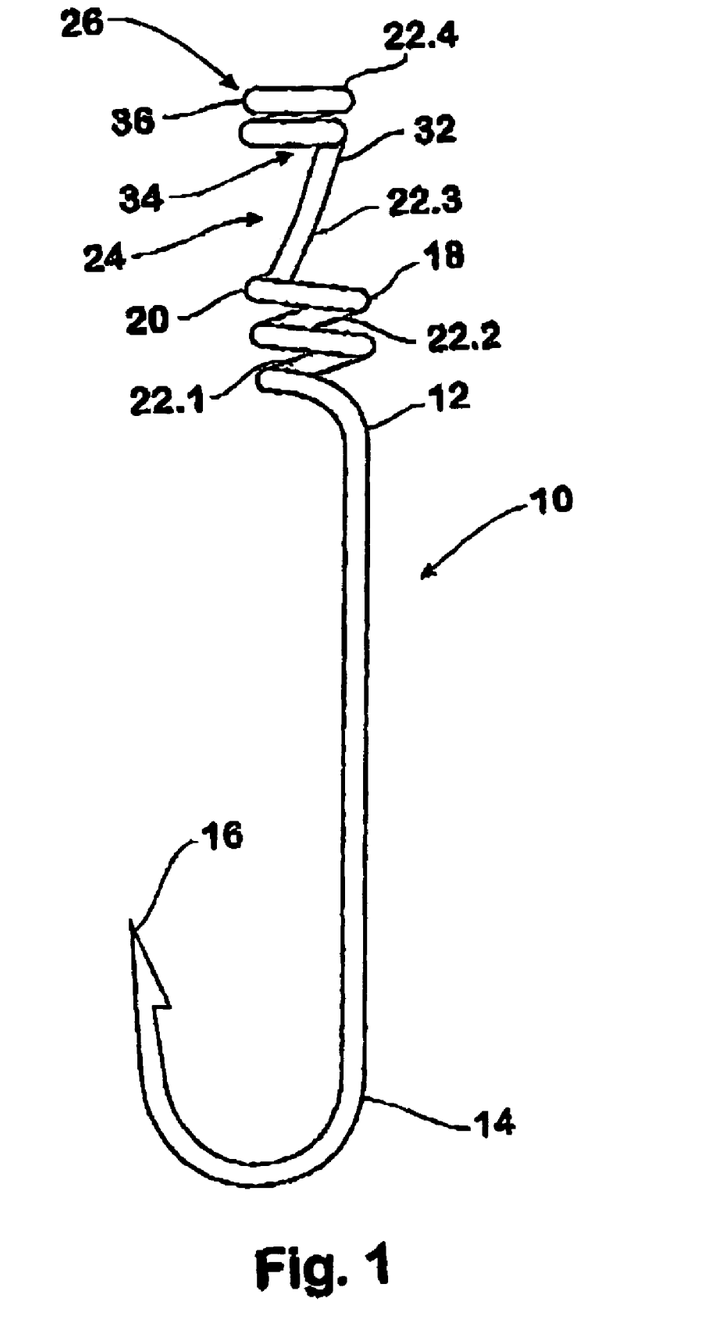
FIG. 1 shows a side view of one embodiment of a fish-hook, according to the invention.
Figure 2:
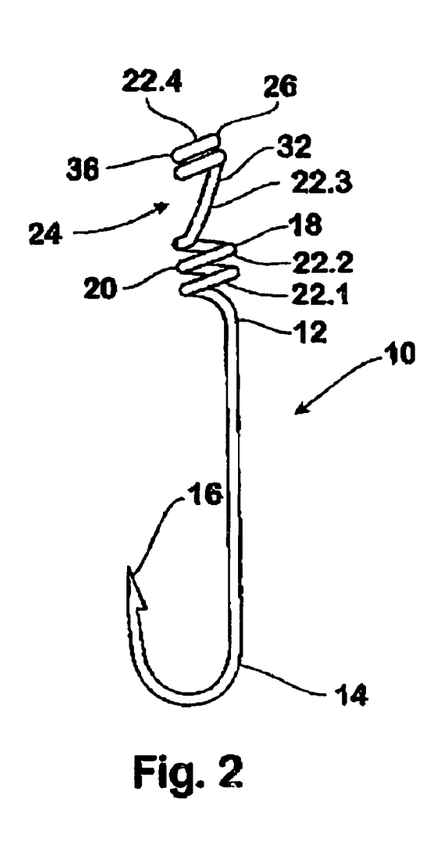
FIG. 2 shows one side of the fish-hook of FIG. 1.
Figure 3:
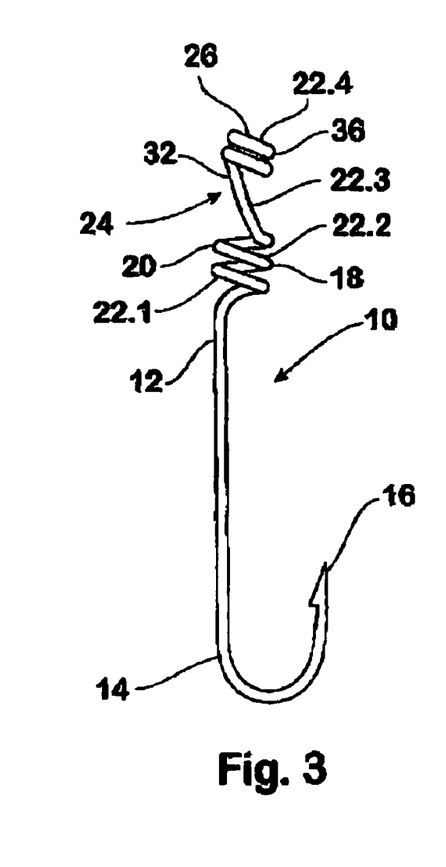
FIG. 3 shows another side of the fish-hook of FIG. 1.

It is to be understood that the fish-hook 10 can be of any size. In particular, the fish-hook 10 can be of a range of sizes that corresponds generally with the available range of sizes of conventional fish-hooks.

The fish-hook 10 includes a shank 12. A bend 14 extends from one end of the shank 12. The bend 14 terminates at a barbed point 16. An end portion 18 of the shank 12 is twisted to defined a helical formation 20.

The helical formation 20 has four spaced volutes 22. These are a first volute 22.1, closest to the bend 14, a second volute 22.2, a third volute 22.3 and a fourth volute 22.4.

The third volute 22.3 is extended to form a linear portion 32 so as to define a gap 24. The gap 24 is significantly larger than remaining spaces between the volutes 22. In particular, the gap 24 is dimensioned to be tactile so that a user can readily determine a position of the gap 24 relative to the spaces between the other volutes 22. The purpose of the gap 24 is described below.

The end portion 18 of the shank 12 defines a retaining formation 26. The fourth volute 22.4 is positioned against or close to the third volute 22.3 so that the fourth volute 22.4 and the third volute 22.3 must be urged apart to permit passage of a fishing line. Thus, the fourth volute 22.4 defines the retaining formation 26.

The fish hook 10 is of convention fish hook material. An example of such a material is stainless steel or high carbon steel. It will thus be appreciated that the material is resiliently flexible.

Figure 6:
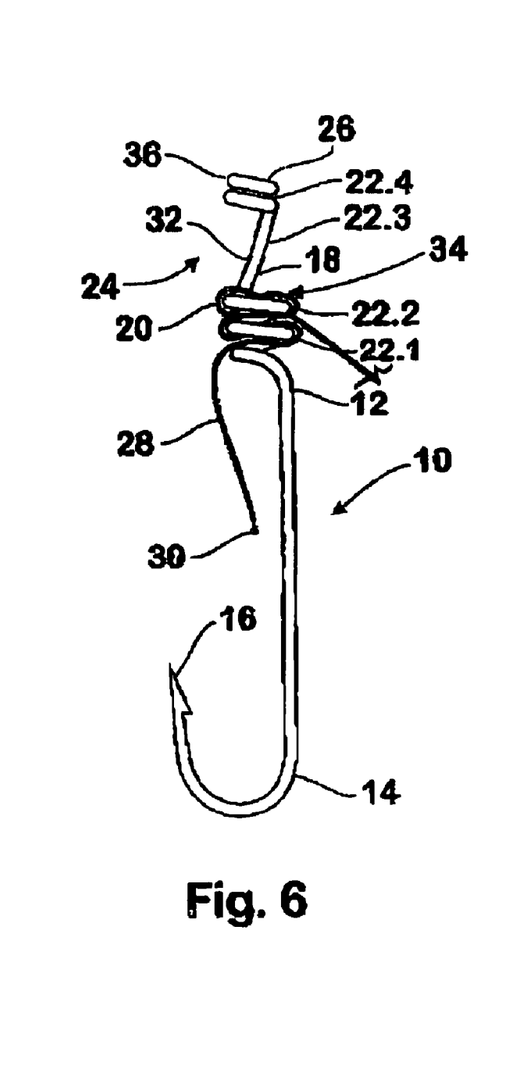
FIG. 6 shows a first stage of attaching the line to the fish-hook of FIG. 1.
Figure 7:
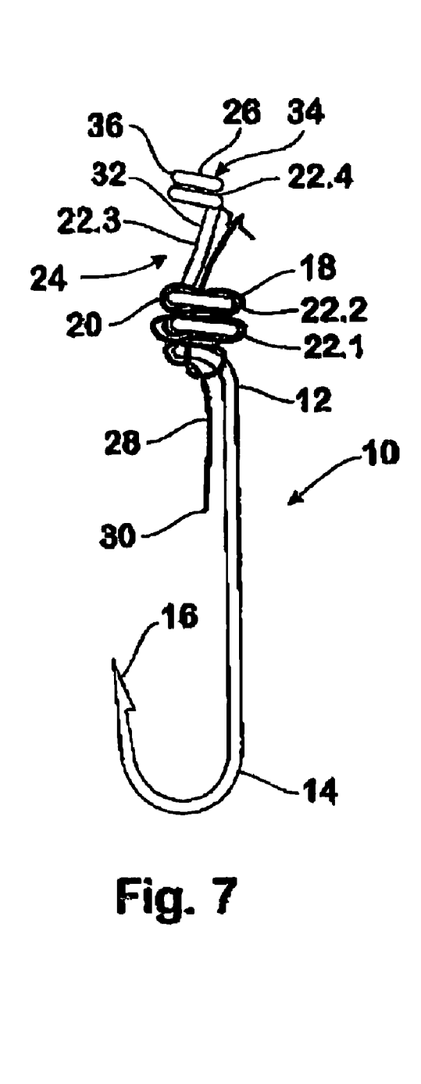
FIG. 7 shows a second stage of attaching the line to the fish-hook of FIG. 1.
Figure 8:
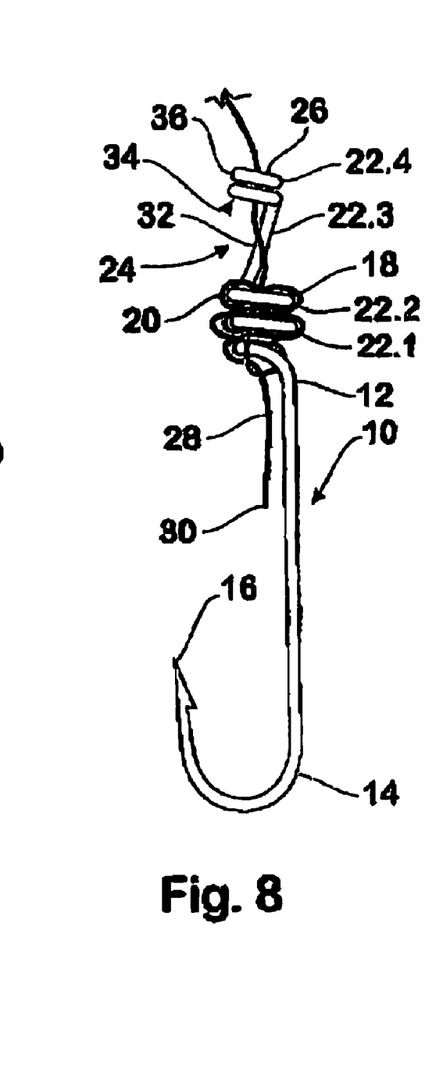
FIG. 8 shows a third stage of attaching line to the fish-hook of FIG. 1.

A particular advantage of the fish-hook 10 is that line 28 is very easy to attach to the shank 12. The steps of fastening the line 28 to the shank 12 are shown in FIGS. 6 to 8. A length of line is held against the shank 12 with a free end 30 positioned near the bend 14. The line 28 is then wrapped about the shank 12, following the first and second volutes 22.1, 22.2, while the free end 30 remains held. At the gap 24, the line 28 is wound back towards the bend 14, again following the volutes 22.1, 22.2.

The gap 24 facilitates the change in winding direction. An extended or linear portion 32 of the third volute 22.3 that defines the gap 24 provides a starting point for the change in winding direction. If necessary, the line 28 can be wound once around the extended portion 32 before being wound back towards the bend 14.

When the wind extends past the first volute 22.1, it is again reversed. This wind follows the volutes 22 again. If necessary, the line 28 can be wound once about the shank 12 before following the volutes 22 again. This time the gap 24 is ignored as shown in FIG. 7 and the line 28 is wound through the third and fourth volutes 22.3, 22.4. The line 28 is urged between the third and fourth volutes 22.3, 22.4. The resilience of the fish hook material permits the third and fourth volutes 22.3, 22.4 to part to allow passage of the line 28 and to return under release of spring tension. This serves to retain the line 28 in a region 34 bound by the volutes 22. An end 36 of the shank 12, which is also the end of the fourth volute 22.4, is rounded to facilitate slipping the line 28 between the third and fourth volutes 22.3, 22.4.

It will be appreciated that the first wind results in the line 28 extending through the region 34. The following two winds serve to lock the line 28 in position against parts of the shank 12. As a tension is applied to the line 28, the line 28 is clamped against the shank 12 at said parts of the shank 12. It will be appreciated that the line is clamped against the shank 12 at a number of spaced positions along the shank 12. This serves to spread loading points along a length of the line 28. A conventional fishing knot tends to generated large amounts of stress at a single location. This can result in unraveling of the line or failure at the knot. The fish-hook 10 avoids this problem by spreading the load generated when the line 28 is under tension.

Figure 4:
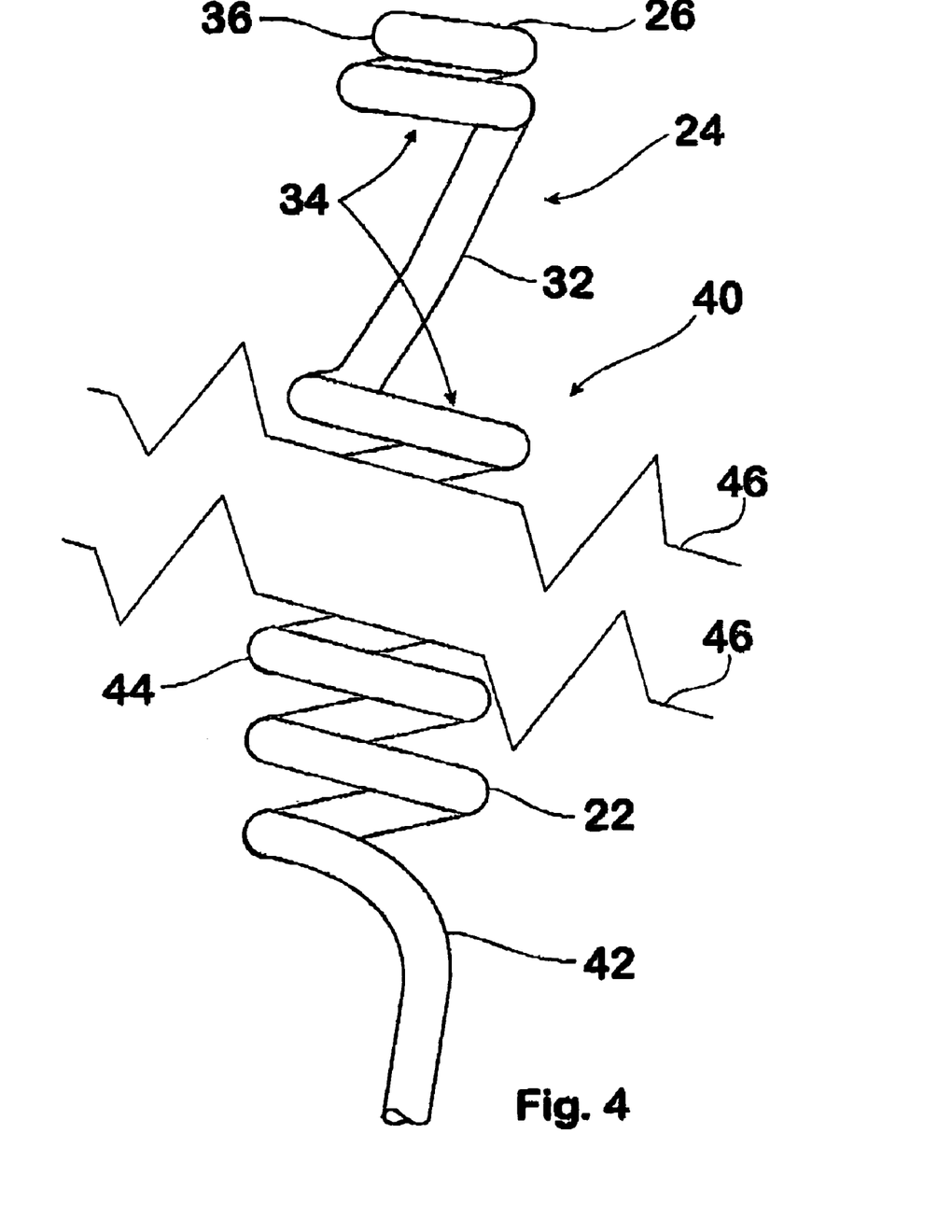
FIG. 4 shows a connecting member of a connecting device, also according to the invention.
Figure 5:
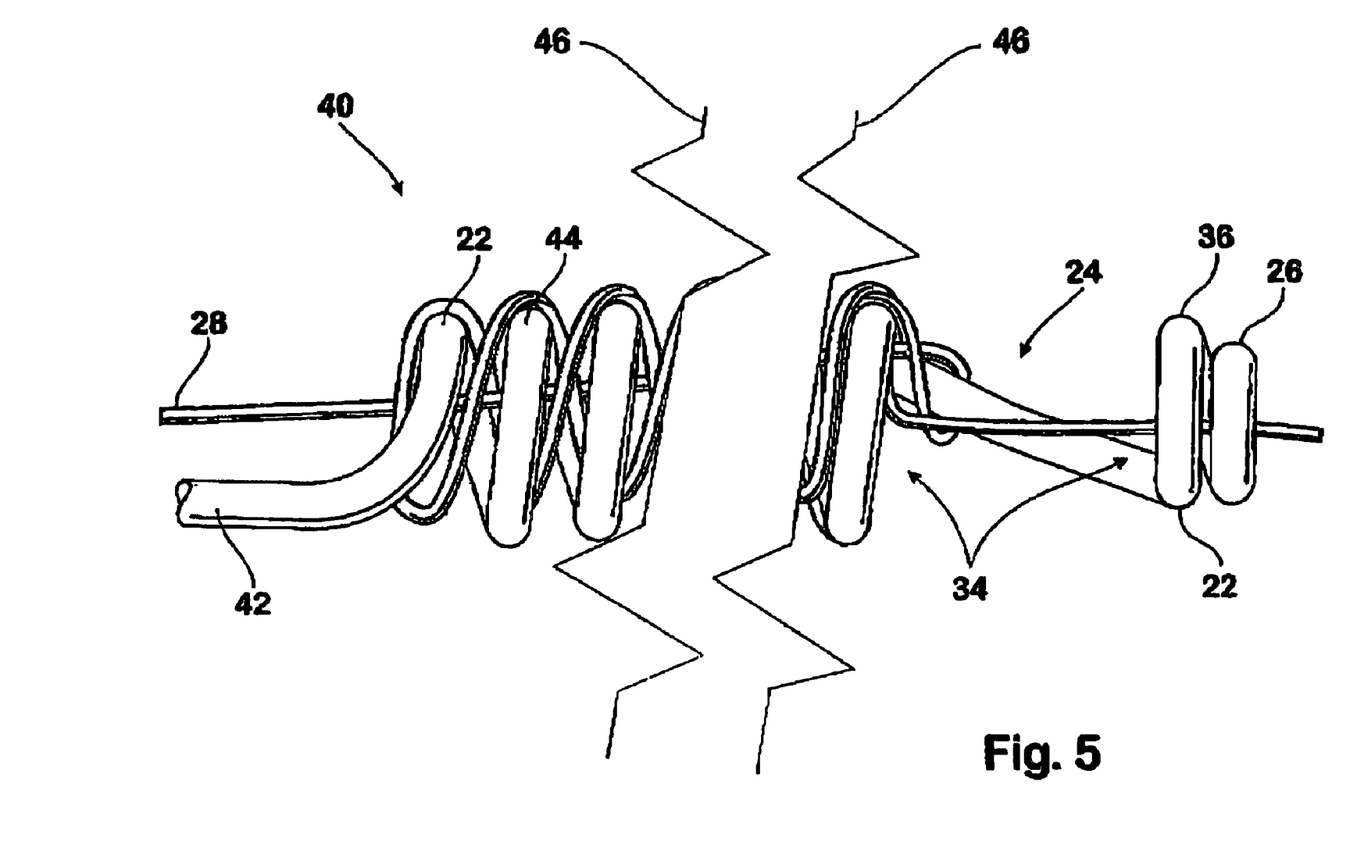
FIG. 5 shows the connecting member of FIG. 4 with line attached to the connecting member.

In FIGS. 4 and 5, reference numeral 40 generally indicates part of a connecting device in accordance with the invention. With reference to FIGS. 1 to 3 and 6 to 8, like reference numerals refer to like parts, unless otherwise specified.

One half of the connecting device 40 is shown since a remaining half is the same. The connecting device 40 includes a shank 42 and a connecting member 44 positioned on each end of the shank 42. The shank 42 and the connecting members 44 are a unitary structure formed from a single length of suitable material such as stainless steel of high-carbon steel.

The connecting device 40 is suitable for connecting two lengths of line together. It will also be appreciated that, instead of a second connecting member 44, that end of the shank 42 not shown could be connected to some other device, such as a fishing lure.

Each connecting member 44 also has volutes 22 to define a helical formation. The volutes 22 are the same as those described with reference to the fish-hook 10. It follows that further description of the connecting members 44 is not necessary. The break lines 46 simply indicate that any number of volutes 22 is possible, depending on the application. This applies to the fish-hook 10 as well.

FIG. 5 shows a slightly different manner of attaching the line to the connecting member 44. In this method the line 18 is first wound through the volutes 22 in the manner described above. The line 28 is then wound once around the extended portion 32 and returned to the shank 42 so that it lies over the volutes 22. The line 28 is then again wound back to the extended portion 32 and between the volute 22.4 and the retaining formation 26. It will readily be understood that the line 28 is also clamped against the connecting member 44 in this method.

It will be appreciated that the connecting device 40 is particularly suited to connecting two lengths of line together. A popular way of connecting two lengths of line together is to use a blood-knot, a tegis knot or a surgeon's knot. The Applicant has carried out a number of test. These tests indicate that the connecting device 40 provides a connection that is more reliable than any of the knots. Further, these knots can be difficult to learn. Older people may also find it difficult to tie such knots. The connecting device only requires the ability to wrap the line in two directions. Clearly, the connecting device 40 is far easier to use than any of those knots.

In FIGS. 9 to 18, reference numeral 50 generally indicates another embodiment of a fish-hook in accordance with the invention. With reference to FIGS. 1 to 8, like reference numerals refer to like parts, unless otherwise specified.

Figure 9:
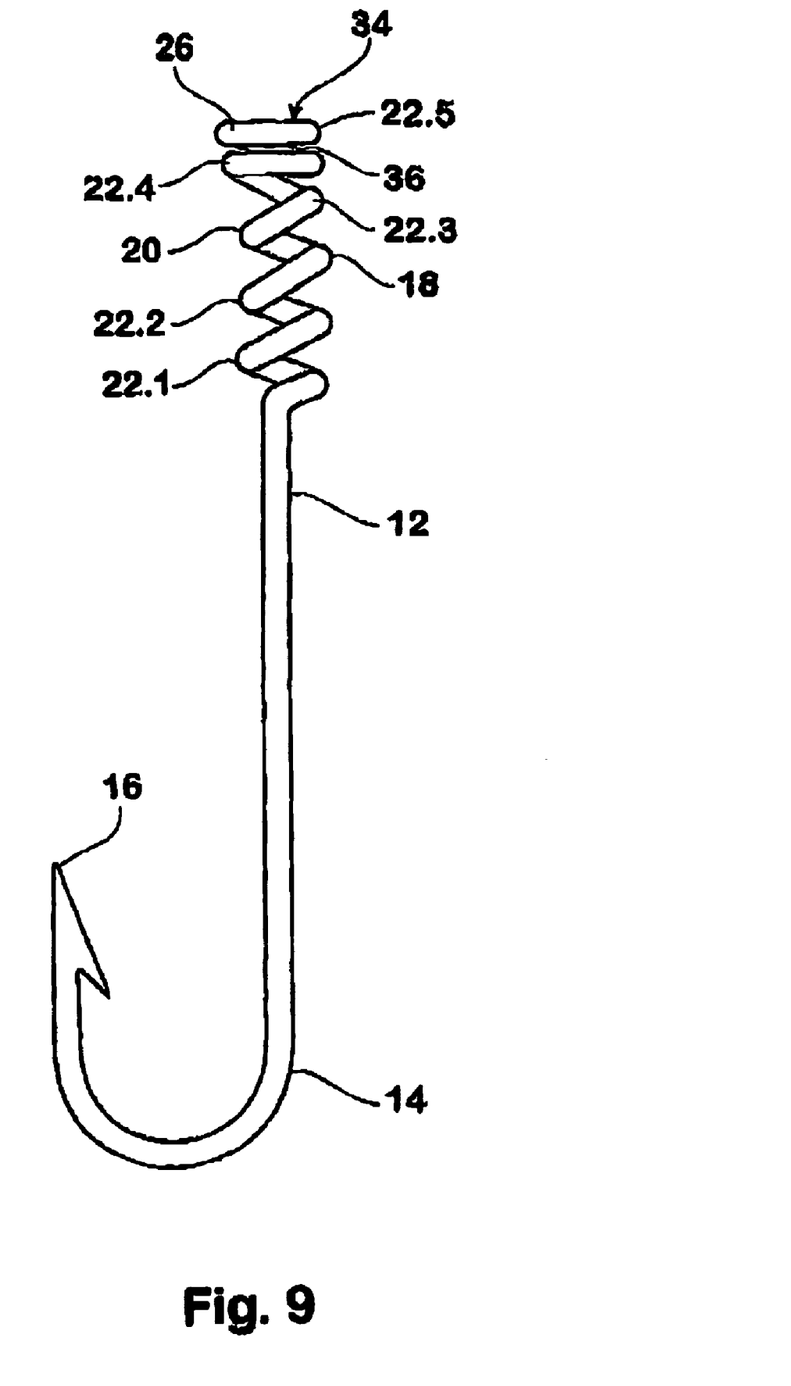
FIG. 9 shows a side view of another embodiment of a fish-hook according to the invention.
Figure 10:
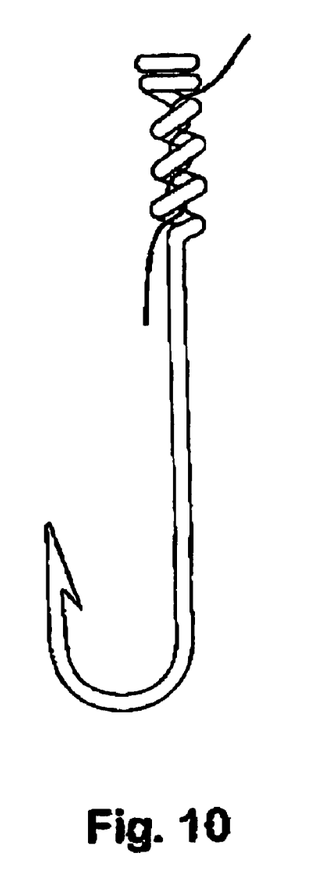
FIG. 10 shows a side view of the fish-hook of FIG. 9 indicating a first stage of attaching line to the fish-hook.
Figure 11:
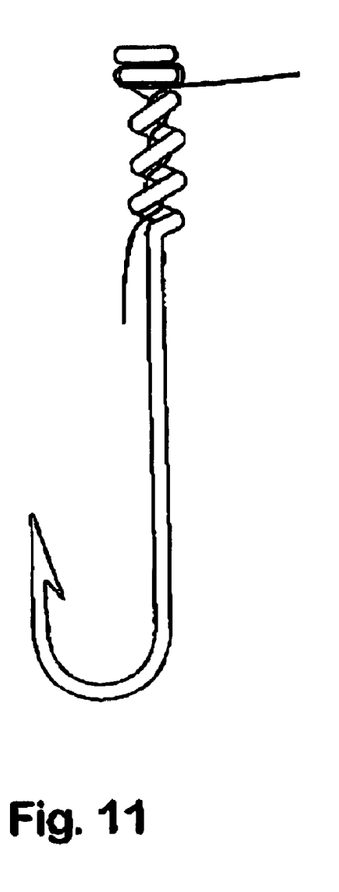
FIG. 11 shows a side view of the fish-hook of FIG. 9 indicating a second stage of attaching line to the fish-hook.
Figure 12:
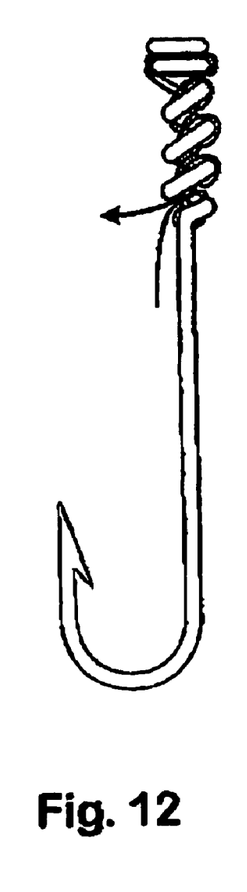
FIG. 12 shows a side view of the fish-hook of FIG. 9 indicating a third stage of attaching line to the fish-hook.

It is clear from the drawings that the primary difference between the fish-hook 10 and the fish-hook 50 is that the fish-hook 50 does not have the gap 54. Instead, the volutes 22 are all evenly spaced except for the last two, with the last volute 22 defining the retaining formation 26.

It should be noted that the fish-hook 50 shown in FIG. 9 has five volutes. 24. This is simply to indicate that the number of volutes 22 can vary depending on the requirements. These requirements could be the thickness of the line 28 and the surface characteristics of the line 18. It follows that in this case the volutes 24 are numbered from 22.1 to 22.5, starting with the volute 22.1 nearest the bend 14. Thus, the volute 22.5 defines the retaining formation 26.

FIG. 10 to 15 show various stages in one method of attaching line to the fish-hook 50.

In a first stage (FIG. 10), the shank 12 is held between a user's left forefinger and thumb, with the thumb holding the line 28 against the shank 12. The line 28 is wound with the right hand from the shank 12 along the volutes 22 through three revolutions to correspond with three successive volutes.

In a second stage (FIG. 11), the line 28 is wound, in a plane perpendicular to the shank 12, one and a half times about the end portion 18.

In a third stage (FIG. 12), the line 28 is wound back down to the shank 12, and one full revolution about the shank 12.

In a fourth stage (FIG. 13), the line 28 is wound back, as in the first stage, three revolutions corresponding with successive volutes 22.

In a fifth stage (FIG. 14), the line 28 is wound, in a plane perpendicular to the shank 12, once about the end portion 18. The line 28 is then urged between the volutes 22 that define the retaining formation 26.

In a sixth stage (FIG. 15), the line 28 is drawn tight to clamp the line 28 against the end portion 18.

As can be seen in the drawings, the direction of winding is constant. It will be readily understood that the winding can be in any direction. Thus, those in the fishing industry will readily appreciate the ease with which the line 28 is attached to the fish-hook 50.

Figure 16:
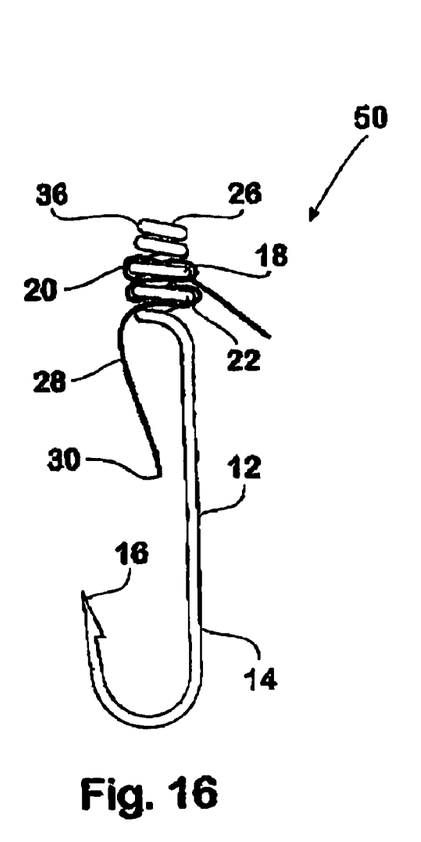
FIG. 16 shows a first stage of another method of attaching line to the fish-hook of FIG. 9.
Figure 17:
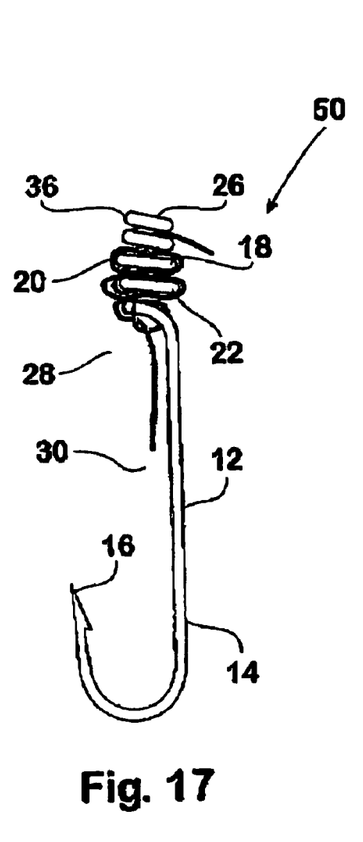
FIG. 17 shows a second stage of another method of attaching line to the fish-hook of FIG. 9.
Figure 18:
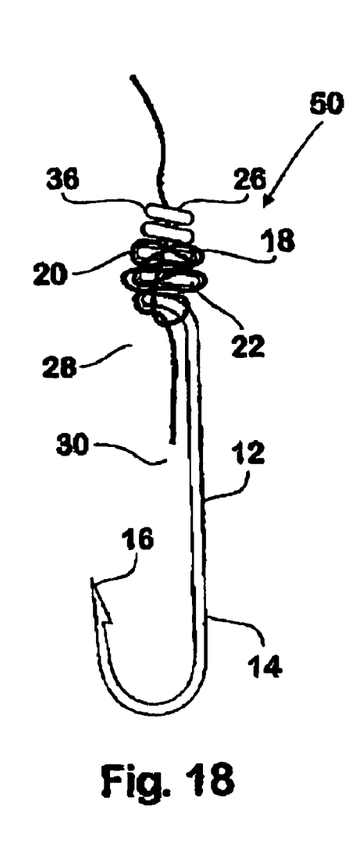
FIG. 18 shows a third stage of another method of attaching line to the fish-hook of FIG. 9.

FIGS. 16 to 18 show another method of attaching the line 28 to the fish-hook 50. Clearly the method of attachment is the same as that for the fish-hook 10. There is no extended portion 32 of the volute 22.3. Thus, the method cannot include using a gap to facilitate a return wind.

It is clear from the experimental results provided below that the fish-hook 10, 50 provides a line attachment means that is superior to the conventional tying methods used presently. Applicant believes that this is amplified by the fact that attachment to the fish-hook 10, 50 is much faster and easier than the conventional methods. This is due largely to the fact that the attachment method involves simply wrapping the line 28 about the shank 12. The volutes 22 not only provide a point of attachment, they also facilitate winding. The reason for this is that a suer can simply follow the volutes 22 when attaching the line 28 to the shank 12.

In commercial fishing, where large numbers of fish-hooks are used, any time saving is desirable. As can be seen from the experiments described below, attaching line to the fish-hook 10, 50 can be three times faster than tying a knot. It will be appreciated that this difference in time will be amplified in poor conditions, such as those often found on long-line fishing boats.

A particular advantage of the fish-hook 10, 50 is that the shank 12 has a shape than can be regarded as a well-known engineering shape. It follows that the manufacture of the fish-hook 10, 50 on a large scale is greatly facilitated. This will serve to keep the cost of the fish-hook 10, 50 comparative to the cost of a conventional fish-hook.

Experimental Procedure and Results—Experiment 1

Experimental Method

Figure 13:
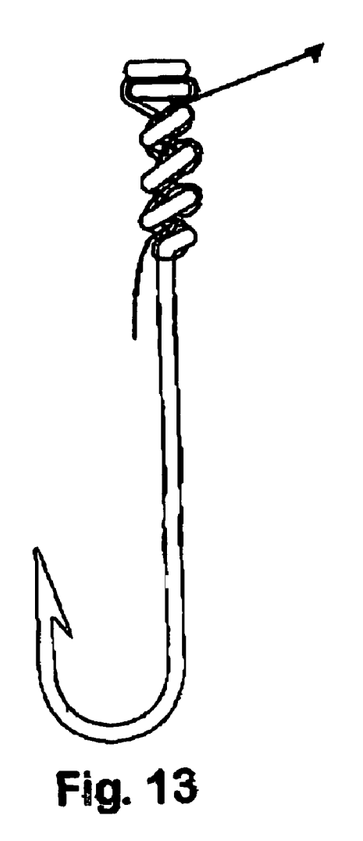
FIG. 13 shows a side view of the fish-hook of FIG. 9 indicating a fourth stage of attaching line to the fish-hook.
Figure 14:
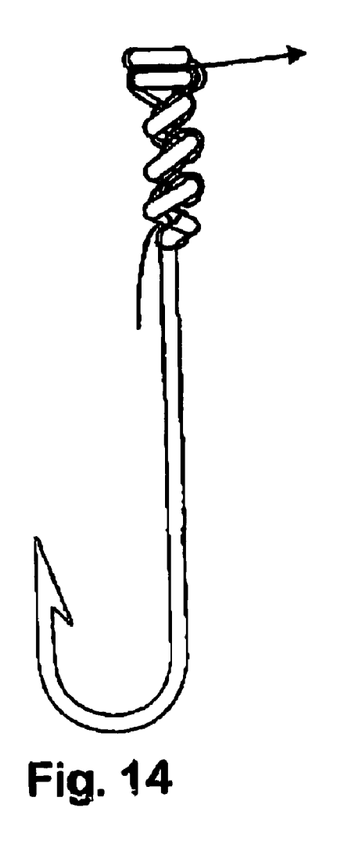
FIG. 14 shows a side view of the fish-hook of FIG. 9 indicating a fifth stage of attaching line to the fish-hook.

The testing apparatus used was a 1KN Hounsfield Tensiometer. The apparatus is shown schematically as 80 in FIG. 13. Two different attachment configurations were tested. One configuration was a line attached to a conventional fish-hook 62 using a conventional half-blood knot. A drawing of the half-blood knot is shown in FIG. 14. This is referred to as the conventional configuration.

The other configuration was a line attached to the fish-hook 40 in the manner described Ten samples of the conventional configuration and six samples of the inventive configuration were used.

The configurations were tested by clamping the relevant fish-hook in a vice 64 and wrapping the line about a guide wheel 66. A load was applied at a rate of 50 mm per minute. The line had a rated load strength of 7.5 kilograms.

Results

FIG. 14 shows a graph of force vs. extension for 6 of the conventional configurations.

Figure 15:
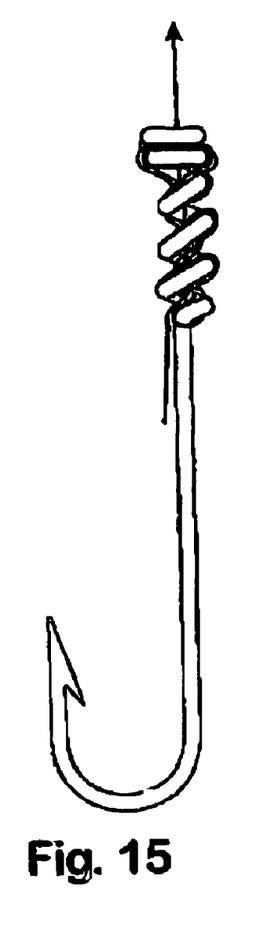
FIG. 15 shows a side view of the fish-hook of FIG. 9 indicating a sixth and final stage of attaching line to the fish-hook.

FIG. 15 shows a graph of force vs. extension for 6 of the inventive configurations.

Clearly, the conventional configurations slipped repeatedly. In fact, it was found that some of the conventional configurations unravelled completely. The inventive configurations, on the other hand, did not slip in any of the tests. All the failures were at around six to seven kilograms due to the line breaking near the fish-hook 40.

Experimental Procedure and Results—Experiment 2

Overview

It was shown that the strength of the attachment of the line 28 to the fish-hook 10 is only slightly dependent on the shape of coil; it varies from about 90% to the strength of the line 18 (in the worst case) to approximately 100% of the strength of the line 18 (in the best case). A few results for conventional knots on conventional hooks are also reported and are shown to be consistent with data available in the open literature.

Experimental Method

The experiments were done with a new reel of fishing line described on the label as "Triplex tensilised mono, uv protected", with a diameter of 0.36 mm and rated at 5.4 kg (53N).

The fish-hook 10 was made from 1 mm diameter mild steel wire.

Tensile Test Machine

The experiments were carried out using an Instron screw driven machine with a 100N capacity load cell. Data logging was done through a standard Instron Merlin system. The crosshead speed was set to 1000 mm/minute (preliminary tests to investigate the effect of the crosshead speed, using speeds of 50 and 1000 mm/minute were carried out and showed little effect).

The device for gripping the line was standard. It involved wrapping the line several times round a 10 mm diameter cylinder and nipping the end in a clamp. The cylinder was held by a clevis that allowed free rotation to avoid bending problems. In no cases did a fracture occur at the cylinder. The hooks were simply hooked around a 2 mm rod, also held in a clevis.

Line was attached to the fish-hook 10 in the manner described above. As set out above, there are a number of ways in which the line 28 can be attached to the fish-hook 10. Method A is carried out without winding the line 28 about the extended portion 32 and the shank 12 before beginning a return wind. Method B does include this further winding.

Figure 20:
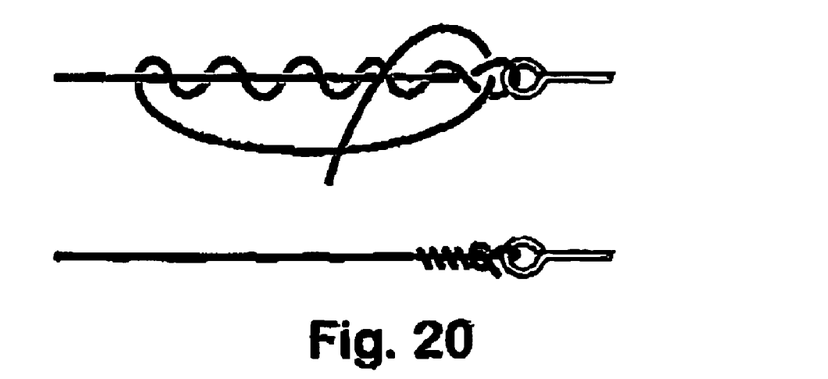
FIG. 20 shows schematic diagram of a half blood knot conventionally used to attach line to a hook.
Figure 21:
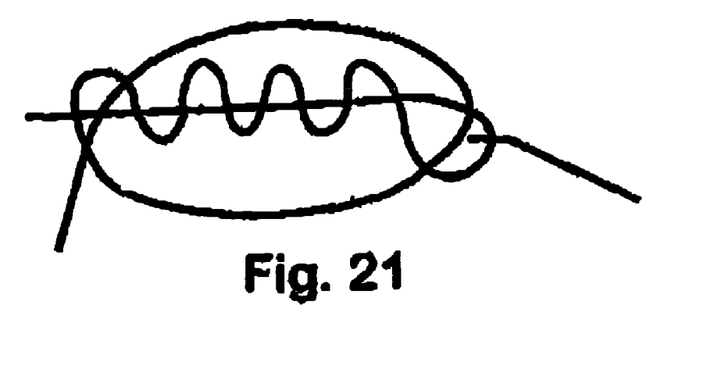
FIG. 21 shows a schematic diagram of a double clinch knot conventionally used to attach line to a hook.

Two types of conventional knots were tested, the double-clinch knot and the half-blood knot. The half-blood knot is shown in FIG. 20 and the double-clinch knot is shown in FIG. 21.

The length of line between the knot/attachment and the gripping point varied from 45 to 110 mm. This meant that the strain rate in the line varied by a factor of nearly 2.5. No systematic effects on strength associated with strain rate were detected. The tests were done at one crosshead speed, 1000 mm/min. (With a length of fishing line of, say, 30 m this test speed corresponds to a fish taking the hook at a speed of about 22 km/hour).

Results

Six tests were made at the start of the investigation to measure the base strength of the line. When testing the strength of the various attachments a few breaks occurred in the line well away from the attachment (i.e., the attachment strength was greater than the strength of the line); a total of 9 such breaks were noted (out of a total of 67 tests on knots). The results of these 15 tests are shown in Table 1 below.

TABLE 1

Strength, N, of the fishing line

| Number of tests | Mean ± Standard deviation – N | Range N |
| --- | --- | --- |
| 15 | 66.2 ± 1.1 | 68.4-64.1 |

Three different embodiments of hook, in accordance with the invention and referred to as hook "A", "B" and "C" and two methods of attachment were tested. The fracture strength for each test was recorded, and the location of the fracture was also noted as either at (or in) the attachment or outside the attachment (i.e., in the line). Fractures occurring less than 5 mm from the attachment were recorded as "at the attachment". The data are shown in Table 2, Table 3 and Table 4. The results for hook "C" are complicated because one of the attachments slipped during loading. This was the only such occurrence in 41 tests. Thus, the results are recorded both with and without this anomalous result. The attachment for hook "C" was with method A since method B was not possible given the configuration of the volutes 22 of the hook "C".

TABLE 2

Strength, N, of attachment to Hook "A" (all tests)
Numbers of fractures occurring at and outside attachment are shown.

| | Fractures at attachment | Fractures outside attachment | Mean ± Standard deviation | Range |
| --- | --- | --- | --- | --- |
| Method B | 6 | 2 | 60.6 ± 4.1 | 65.2*-51.8 |
| Method A | 6 | 2 | 68.0 ± 7.1 | 65.8*-44.8 |

*broke outside attachment

TABLE 3

Strength, N, of attachment to Hook "B" (all tests)
Numbers of fractures occurring at and outside attachment are shown.

| | Fractures at attachment | Fractures outside attachment | Mean ± Standard deviation | Range |
| --- | --- | --- | --- | --- |
| Method B | 6 | 0 | 62.9 ± 2.3 | 65.2*-51.8 |
| Method A | 6 | 0 | 61.9 ± 3.7 | 65.8*-44.8 |

*broke outside attachment

TABLE 4

Strength, N, of attachments to Hook "C" (all tests).
Attachments in accordance with method A.
Numbers of fractures occurring at and outside attachment are shown.

| | Fractures at attachment | Fractures outside attachment | Mean ± Standard deviation | Range |
| --- | --- | --- | --- | --- |
| All data | 5 | 2 | 64.2 ± 7.0 | 67.2*-48.5 |
| Ignore slipped experiment | 4 | 2 | 66.8 ± 1.0 | 67.2*-65.2 |

*broke outside-attachment

Tests were also done on a double-clinch knot and on a half-blood. First, in all three datasets the strength of the knot was significantly less than that of the line so that no fractures occurred in the line away from the knot. Second, in several cases (7 out of 24 tests) the knots slipped, sometimes completely unravelling the knot. The results for the tests in which no slipping occurred are shown in Table 5.

TABLE 5

Strengths, N, of conventional knots
(not including tests in which slipping occurred)

| | Number of tests | Mean ± Standard deviation | Range |
| --- | --- | --- | --- |
| Double-clinch | 14 | 54.6 ± 6.6 | 68.3-42.4 |
| Half-blood | 5 | 54.9 ± 5.7 | 63.6-49.5 |

The time to tie knots was measured. Attachment to the fish-hook 10 took about 12 seconds and for the conventional knots it was about 35 seconds for a skilled fisherman.

Conclusions

The data shown in Tables 1 to 4 show that the strength of the attachment to the fish-hook 10, 50 is only slightly dependent on the shape of the coil or on the method of tying the knot. Expressed as a percentage of the base line strength, the attachment has a strength of between 88% and 100% of the line strength (depending on coil design and tying method).

The data shown in Table 5 show that the strength of two conventional knots is about 83% of the line strength. However, 7 out of 24 knots slipped on testing and these gave strengths as low as 33% of line strength (these data were not included in the calculation of 83%). These strength figures are consistent with those reported elsewhere. For example, values of between 60% and "greater than 90%" of line strength are given on www.ao.net/-nautbob/fishknot.html.

The consistency of strength can be measured as (a) the standard deviation of the mean, or (b) the absolute range of strengths recorded, or (c) the proportion of knots that slipped. Comparing the data for Hook C (Table 4) with those for conventional knots (Table 5) it can be seen that the attachment method A and method B are superior to the conventional methods in this regard.

The invention claimed is:

1. A fish hook including:
   (i) a shank having an axis extending along a length thereof;
   (ii) a bend extending from the shank;
   (iii) a point defined by a free end of the bend;
   (iv) a retaining formation formed by a pair of first volutes located at an end of the shank remote from the bend, the pair of first volutes being located adjacent to each other so as to either directly contact each other or form a first minimum gap therebetween, the first volutes collectively forming a helix about a central axis, each of the first volutes being resiliently flexible with respect to each other, the pair of first volutes being configured to permit a fishing line to pass between the first volutes by resilient separation of the first volutes when the fishing line is pressed between the first volutes; and
   (v) a helical formation having a plurality of spaced apart second volutes positioned between the shank and the retaining formation, the second volutes of the helical formation being spaced from each other to form second minimum gaps therebetween, each of the second minimum gaps between the second volutes of the helical formation being larger than any first minimum gap between the pair of first volutes of the retaining formation, the retaining formation and the helical formation being configured so that a fishing line can be freely passed between the second volutes of the helical formation without farther separation of the second volutes but the fishing line can only be passed between the first volutes of the retaining formation by further separation of the first volutes.

2. A fish hook as claimed in claim 1 wherein the helical formation is located adjacent the retaining formation.

3. A fish hook as claimed in claim 1 wherein the helical formation is separated from the retaining formation by a gap.

4. A fish hook as claimed in claim 3 wherein a linear portion which defines the gap extends between the helical formation and the retaining formation.

5. A connecting device for a fishing line comprising:
   (i) a shank having an axis extending along a length thereof; and
   (ii) a retaining formation formed by a pair of first volutes located at an end of the shank, the pair of first volutes being located adjacent to each other so as to either directly contact each other or form a first minimum gap therebetween, the first volutes collectively forming a helix about a central axis, each of the first volutes being resiliently flexible with respect to each other, the pair of first volutes being configured to permit a fishing line to pass between the first volutes by resilient separation of the first volutes when the fishing line is pressed between the first volutes; and
   (iii) a helical formation having a plurality of spaced apart second volutes positioned between the shank and the retaining formation, the second volutes of the helical formation being spaced from each other to form second minimum gaps therebetween, each of the second minimum gaps between the second volutes of the helical formation being larger than any first minimum gap between the pair of first volutes of the retaining formation, the retaining formation and the helical formation being configured so that a fishing line can be freely passed between the second volutes of the helical formation without farther separation of the second volutes but the fishing line can only be passed between the first volutes of the retaining formation by further separation of the first volutes.

6. A connecting device as claimed in claim 5 having at each end thereof the retaining formation separated by the shank.

7. A connecting device as claimed in claim 5 wherein the helical formation is located adjacent to the retaining formation.

8. A fish hook as claimed in claim 1, wherein the retaining formation and the helical formation are integrally formed together as a single unitary continuous member.

9. A fish hook as claimed in claim 1, wherein the central axis of the retaining formation extends parallel to the axis of the shank.

10. A fish hook as claimed in claim 1, wherein the second volutes form a helix about a central axis, the central axis of the second volutes extending parallel to the central axis of the first volutes.

11. A connecting device as claimed in claim 5, wherein the retaining formation and the helical formation are integrally formed together as a single unitary continuous member.

12. A connecting device as claimed in claim 5, wherein the central axis of the retaining formation extends parallel to the axis of the shank.

13. A connecting device as claimed in claim 5, wherein the second volutes form a helix about a central axis, the central axis of the second volutes extending parallel to the central axis of the first volutes.

* * * * *

UNITED STATES PATENT AND TRADEMARK OFFICE
CERTIFICATE OF CORRECTION

PATENT NO. : 7,581,348 B2
APPLICATION NO. : 10/484376
DATED : September 1, 2009
INVENTOR(S) : Taylor It is certified that error appears in the above-identified patent and that said Letters Patent is hereby corrected as shown below:

Title Page
Line 6, Abstract, change "tod the bend" to --to the bend--
Line 7, Abstract, change "from the the bend" to --from the bend--

Column 1
Line 46, change "require" to --requires--

Column 2
Line 29, change "know" to --knot--

Column 3
Line 16, change "fall" to --fail--
Line 18, change "addressed" to --addresses--

Column 4
Line 14, change "by by" to --by--
Line 18, change "reset" to --respect--

Column 5
Line 10, change "schematic" to --a schematic--
Line 34, change "defined" to --define--
Line 52, change "convention" to --conventional--

Column 6
Line 54, change "18" to --28--

Column 7
Line 14, change "54" to --24--
Line 18, change "volutes 24" to --volutes 22--
Line 22, change "18" to --28--
Line 23, change "24" to --22--

Signed and Sealed this

Thirty-first Day of August, 2010

David J. Kappos
*Director of the United States Patent and Trademark Office*

CERTIFICATE OF CORRECTION (continued)
U.S. Pat. No. 7,581,348 B2

Figure 19:
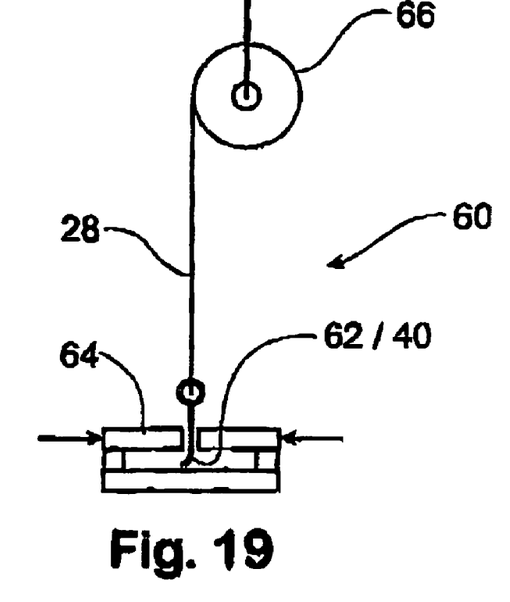
FIG. 19 shows a schematic diagram of a test apparatus used in an experiment to test the attachment ability of the fish-hook of FIG. 8.
Figure 22:
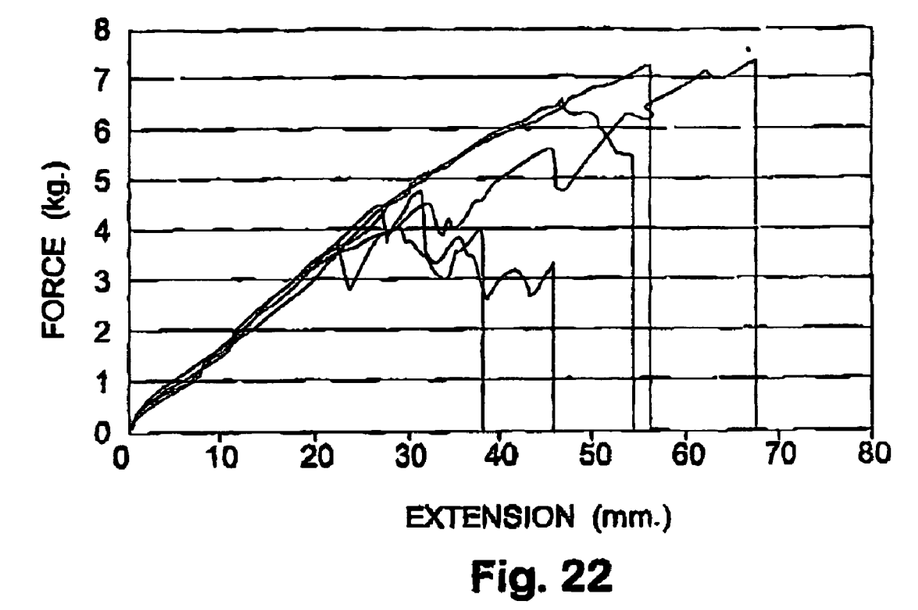
FIG. 22 shows force-extension graphs generated as a result of tests carried out on conventional half-blood knots used for tying fishing line to a conventional fish-hook.
Figure 23:
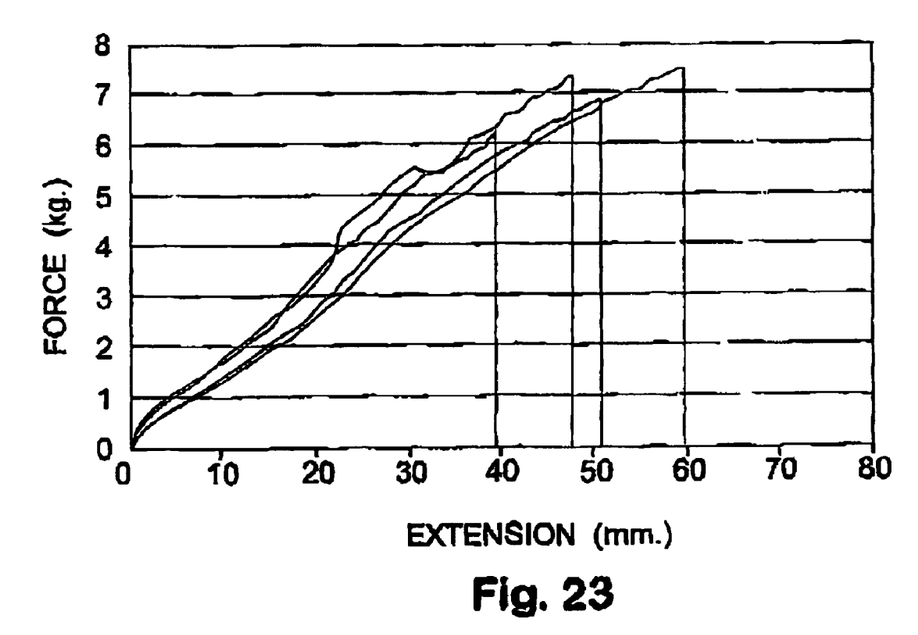
FIG. 23 shows force-extension graphs generated as a result of tests carried out on attachments of fishing line to a fish-hook in accordance with the invention.

<u>Column 8</u>
Line 21, change "80" to --60--
Line 22, change "FIG. 13" to --FIG. 19--
Line 25, change "FIG. 14" to --FIG. 20--
Line 36, change "FIG. 14" to --FIG. 22--
Line 38, change "FIG. 15" to --FIG. 23--
Lines 52 and 54, change "18" to --28--